(12) United States Patent
Kostecki

(10) Patent No.: US 6,854,808 B2
(45) Date of Patent: Feb. 15, 2005

(54) MATERIALS TRANSPORT CONTAINER

(76) Inventor: Gene Kostecki, 40 Bramwell Road, Noranda (AU), 6062

( * ) Notice: Subject to any disclaimer, the term of this patent is extended or adjusted under 35 U.S.C. 154(b) by 0 days.

(21) Appl. No.: 10/416,398

(22) PCT Filed: Nov. 20, 2001

(86) PCT No.: PCT/AU01/01409

§ 371 (c)(1),
(2), (4) Date: May 9, 2003

(87) PCT Pub. No.: WO02/40315

PCT Pub. Date: May 23, 2002

(65) Prior Publication Data

US 2004/0026959 A1 Feb. 12, 2004

(30) Foreign Application Priority Data

Nov. 20, 2000 (AU) .............................. PR1531

(51) Int. Cl.⁷ .............................................. B60R 13/01
(52) U.S. Cl. ...................... 298/7; 296/39.2; 296/183.2; 37/453
(58) Field of Search .................... 298/7, 18; 296/183.2, 296/41, 39.2; 37/451, 453, 460

(56) References Cited

U.S. PATENT DOCUMENTS

| 3,480,321 | A | * | 11/1969 | Bertil et al. | ............. 296/183.1 |
| 3,652,123 | A | * | 3/1972 | Speers | ...................... 296/183.1 |
| 3,729,230 | A | * | 4/1973 | Tomlinson et al. | ............. 298/7 |
| 3,790,353 | A | * | 2/1974 | Jackson et al. | ............... 75/236 |
| 4,474,404 | A | * | 10/1984 | Hagenbuch | ............... 296/182.1 |
| 5,362,937 | A | * | 11/1994 | Browne et al. | ........... 219/76.14 |
| 5,803,531 | A | * | 9/1998 | Nielsen | .................... 296/184.1 |
| 6,007,132 | A | * | 12/1999 | Burg et al. | ................ 296/39.2 |
| 6,022,068 | A | * | 2/2000 | D'Amico | ................. 296/183.2 |
| 6,076,693 | A | * | 6/2000 | Reiter et al. | ................. 220/9.1 |
| 6,129,409 | A | * | 10/2000 | D'Amico | ................. 296/183.2 |
| 6,174,014 | B1 | | 1/2001 | Hook et al. | |
| 6,305,731 | B1 | * | 10/2001 | Hook et al. | ................ 296/39.2 |

FOREIGN PATENT DOCUMENTS

| AU | 40564/95 A | 7/1996 |
| JP | 09088111 A | 3/1997 |
| WO | WO 9823466 A1 | 6/1998 |

* cited by examiner

Primary Examiner—Stephen Gordon
(74) Attorney, Agent, or Firm—R. Neil Sudol; Henry D. Coleman; William J. Sapone

(57) ABSTRACT

A materials transport container having a floor and two opposed upwardly extending side walls and a front wall. The container is supported to enable tilting for unloading of material from a rear end. The container has a substantially continuous and smooth hard faced surface on a rear portion of the floor adjacent the rear end to enhance sliding of its load over the smooth hard faced surface. Additionally arcuate surfaces bridging a junction between one or more of the front and side walls and the floor of the container to reduce hangup of material. The arcuate surfaces are smooth hard faced surfaces. The hard faced surfaces are provided by removable wear plates with gaps between then to allow flexion and ease of removal. It is found with use these hard faced wear plates become polished and greatly assist with the removal of material from the transport container.

21 Claims, 6 Drawing Sheets

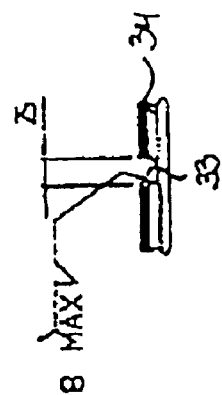
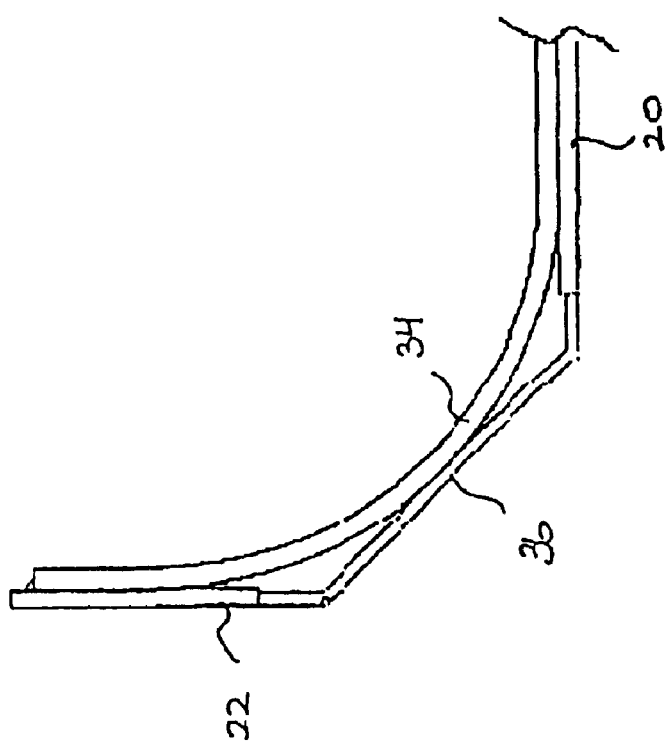

MATERIALS TRANSPORT CONTAINER

FIELD OF THE INVENTION

The present invention relates to bulk materials transport containers, and in particular to bulk materials transport containers such as dump bodies of dump trucks or buckets of front end loaders that have improved flow characteristics of bulk materials across surfaces of the container upon unloading the container.

BACKGROUND OF THE INVENTION

Bulk materials transport containers such as dump bodies on dump trucks, buckets on front end loaders and the like are used in many industries for the transport of materials from one area to another. For example, in the mining industry dump trucks are used to transport mined materials from the mine site to a processing site. In the case of the mining industry, as well as many other industries, the material transported can have a hardness that is greater than the material from which the container is formed, which is typically steel. As a result, the load materials can be very abrasive and movement of the materials across internal surfaces of the container during loading, and more particularly unloading, tends to wear the surfaces rapidly. Because of this the transport containers can experience significant down time whilst the surfaces are being refabricated to prolong the life of the container.

Movement of the materials across internal surfaces of the transport container, such as when the container is tipped to allow flow out of an end of the container, leads to abrasion or scoring of the metal of the container. Abrasion of the surface then results in an increased resistance to flow of material across the surface and therefore a resultant increase in difficulty in emptying the container.

In practice, it is known that once an area of the container has become abraded there can be a significant 'hang up' of material in the abraded area, which means that, despite the container being tilted or tipped to enable emptying of the material by gravity flow, some material does not flow out of the container under the influence of gravity alone. For example, referring to a dump body on the back of a dump truck, it has been known for the forward most area of the container adjacent the junction between the forward wall and floor of the container to become abraded so that when the container is tilted and the forward most area of the container is raised, the material can be hung up in that area and will not flow out of the container under the influence of gravity alone. Under these circumstances operators will normally rapidly raise and lower the dump body about its pivot in an attempt to jar the material loose. This procedure then leads to an accelerated wearing of the dump bodies as well as the hydraulic mechanism used to raise the dump body. Alternatively, some physical intervention is usually required to move the load out of the container, which then raises issues of additional time and danger in emptying the container.

To overcome these difficulties it is known to hang lines of heavy metal chains across the dump body so that as the body is emptied, the chains bang against the body and/or the material being emptied to thereby physically prevent material being hung up in the body.

In many materials transport containers it is known to provide wear plates on surfaces that are subject to constant abrasion. For example U.S. Pat. No. 6,076,693 to Reiter et al. describes a sacrificial one piece insert for a transport container such as a dump truck body. The liner is formed from a plastics material and can be interchanged when worn. Whilst the plastics liners may be useful for soft material such as flour, the hardness of material transported in the mining industry for example means that the liners wear rapidly and for that reason are not suited to many industries.

U.S. Pat. No. 6,007,132 to Burg et al. describes a liner suitable for use in the dump body of a dump truck. The liner has raised strips of an abrasion resistant cladding wherein the raised strips are aligned transverse to the flow of material so that the strips cause material to tumble rather than slide over the surface. This tumbling action is said to be less abrasive than a sliding action over the surface. However the raised strips protrude into the flow path of material and therefore are subjected to strong abrasive forces and therefore tend to wear faster than if the material was sliding over the surface.

U.S. Pat. No. 6,022,068 to D'Amico relates to a modified dump truck body with enhanced hardness and thickness toward the rear of the body. D'Amico also does not disclose the use of removable wear plates or the provision of an arcuate surface to assist in unloading.

U.S. Pat. No 6,174,014 to Hook et al., discloses the use of a liner for use in the rear of a dump truck body. The liner however is a web of protrusions and does not disclose a smooth surface, nor the provision of an arcuate surface between the floor and side or front walls of the dump truck.

In many instances the prior art addresses issues of minimising wear, but not of maximising the flow of material over a surface, and in particular over the surface of a dump body of a dump truck.

OBJECT OF THE INVENTION

The object of this invention is to provide a materials transport container such as the dump body of a dump truck or the bucket of a front end loader that obviates or alleviates any one of the above problems, or at least to provide the public with a useful choice.

SUMMARY OF THE INVENTION

In a first aspect, but not necessarily the broadest or only aspect, the invention could be said to reside in a materials transport container having a floor and two opposed side walls and a front wall said walls extending upwardly from the floor, the container further having an unloading end (or rear end), the container supported to enable tilting for unloading of material from the unloading end, the container having a substantially continuous and smooth hard faced surface on an unloading portion of the floor adjacent the rear end, so as to enhance the sliding of material over the smooth hard faced surface, the hard facing is provided by a layer of hard surfacing alloy there being provided one or more arcuate surfaces bridging a junction between one or more of the front and side walls and the floor of the container to reduce hangup of material thereon.

The container may be any suitable container for use in the mining, earthmoving, building or other industries in which material is required to slide over a surface during a loading or unloading operation. Examples include, but are not limited to, dump bodies for dump trucks, materials handling chutes, and buckets. For the purposes of illustration the invention will be discussed in terms of a dump body used on a dump truck, wherein a forward end of the body is tilted upward to empty the material out of the back end of the body under the influence of gravity. A benefit of the present invention is that the decreased resistance to materials sliding over the surface means that the dump body does not have to be rapidly raised and lowered, thus reducing wear on the hydraulic mechanism used to raise the dump body.

The hard facing may form an integral part of the body of the container, so that the container needs to be rebuilt should the hard facing be worn, however preferably wear plates are fitted to an already formed container, so that the wear plates can simply be fitted to the body, and when worn can be taken off and replaced.

In addition to the above, in practice it is found that the junctions between the side walls and the floor surface of dump bodies are also subjected to a high degree of abrasion and form an area where two adhesive surfaces are angled to each other in such a way that material tends to hang up in the junctions when the body is tilted, and the material does not flow under the influence of gravity alone.

Therefore in order to further assist flow of material and/or minimise hang up of material, plates may be fitted over junctions between one or more walls and the floor surface so that the plates extend between the wall and the floor in order to minimise hang up caused by the angled junction. The plates need not be in the form of wear plates and could be formed from mild steel, for example, provided that a combination of the plates over the wall/floor junction(s) as well as the wear plates on the floor surface assists in flow of loaded material out of the container.

However, in one preferred form the materials transport container is provided with one or more wear resistant plates extending between the floor and wall of a container such that the plate extends over a junction between the floor and a wall of the container.

In one particularly preferred form of this aspect of the invention the plates are curved and are fitted between the wall and the floor so that they are outwardly concave. Preferably the radius of curvature of the plates is such that the material is able to slide over the surface without materials being hung up in an angled junction between the floor and wall.

It is found that the junction between the front wall of the dump body and the floor surface, as well as junctions between the side walls and the floor surface tend to be abraded rapidly and therefore preferably wear resistant plates are fitted at least over one of those junctions and more preferably over all wall/floor junctions. Most preferably the container is fitted with wear resistant plates over the front wall and floor junction, the side walls and floor junctions as well as on the back third of the floor surface.

The term wear plate is used herein to define any plate of material having a backing and which has been hard faced with a suitable hard surfacing alloy. It is the hard faced surface of the wear plate which contacts the material load and over which the material slides during unloading.

In a preferred form of the invention, the wear plates are formed from a mild steel backing onto which the hard surfacing alloy material is overlayed. Preferably the hard surfacing alloy is a carbide containing alloy with a high carbide structure that has increased wear resistance. The carbides are preferably a combination of primary and secondary carbides dispersed in an alloy matrix. The carbide particles themselves may have a Brinell hardness of 1600 to 1800. Preferably the combined primary and secondary carbide content of the alloy is greater than 30% and more preferably is greater than 40%. The hard surfacing alloy may be any suitable alloy however preferably the alloy is a carbide containing alloy, such as chromium carbide, niobium (columbium) carbide, tungsten carbide, vanadium carbide, cobalt carbide or any other suitable alloy that can form suitable carbides.

Preferably the hard surfacing alloy has a hardness that is greater than the hardness of the material from which the container is formed. More preferably the hard surfacing alloy has a Brinell hardness of greater than 500 and the wear plates are fitted to a steel container having a Brinell hardness of less than 350.

It has been found that the wear plates formed from these materials tend to become highly polished upon sliding of material over the surface and that the polished surface significantly decreases any adhesive contact between the surface and the materials, especially moist materials. Therefore the wear plates not only minimise scoring of the surface but also become highly polished as they are used which therefore decreases resistance to sliding of materials over the surface on use.

In practice it is found that a rear portion of the floor surface of the dump body experiences significant abrasion and once it is abraded it limits flow of material out of the container because the abraded surface is the lowermost surface when the container is tilted for unloading. The abraded or scored lowermost surface then tends to cause the load of material to bridge, stick, freeze or hang up on the lowermost floor surface, therefore resulting in the load being hung up in the dump body.

Preferably the wear plates are provided in strip form so that the surface to be covered can be covered by a plurality of strips. The strips may be abutted against one another to form a more or less continuous surface. This allows surfaces of various sizes and configurations to be covered without having to manufacture plates to conform to any specific size or shape. More preferably however, the strips are laid transverse to the direction of flow of material and they are laid with a gap between adjacent strips, to allow for flexion of adjacently placed wear plates. The width of the gap may be between 5 and 20 percent of the width of the strips used. For example, for strips that are between 200 and 400 mm wide, a gap of between 25 and 30 mm is preferably left between adjacent strips. Preferably, the gap may be more narrow so that when loaded material fills the gaps it does not significantly affect sliding of the material over the hard faced surface.

In one form of the invention, the whole floor surface of the dump body is covered with wear resistant plates, although it will be appreciated that this may not be necessary as it has been found that for most load materials coverage of about the back third of the container is sufficient.

Alternatively, or in addition, one or more walls of the container, or sections thereof, may also be covered by the wear resistant plates.

The transport container may be manufactured with the wear plates fitted or alternatively an existing container may be modified by fitting wear plates to existing surfaces of the container.

In a second aspect the invention could be said to reside in a vehicle having a materials transport container of the first aspect of the invention.

In a third aspect the invention could be said to reside in method of minimising hang up of material in a materials transport container of the type that can be tilted to one side or to the back for unloading, the method including the step of fixing wear resistant plates according to the first aspect of the invention.

The plates may be fixed using any suitable means, including by use of studs or other fasteners, by welding in countersunk hole inserts, and by plug or stitch welding.

In a fourth aspect, the invention could be said to reside in a materials transport container having at least one surface over which material slides for unloading of the container and having a first and second opposed wall extending upwardly on either side of the container, and one or more wear plates covering at least a part of said surface, said wear plate(s) reducing abrasion or scoring of the surface so that resistance to sliding of materials over the surface is reduced and said plates laid in strips transverse to the direction of flow of material over the surface with gaps formed between adjacent strips, there being provided one or more arcuate wear plates bridging a junction between the side walls and the floor of the container to reduce hangup of material thereon.

This form of the invention is not necessarily restricted to the material transport containers of the type described in the previous aspects of the invention, and as such this form of the invention can include materials handling chutes, and like equipment.

The surface to be covered can be covered by a plurality of strips and this allows surfaces of various sizes and configurations to be covered without having to manufacture plates to conform to any specific size or shape.

The plates may be fixed using any suitable means, including by use of studs or other fasteners, by welding in countersunk hole inserts, and by plug or stitch welding.

BRIEF DESCRIPTION OF THE DRAWINGS

For a better understanding the invention will now be described with reference to an illustrated embodiment. The drawings describe an illustrated embodiment wherein, FIG. 7 is a side cross sectional view showing a wear plate fitted over a side wall/floor junction, and FIG. 8 is a longitudinal side view showing spacing between side wall/floor junction wear plates.

DETAILED DESCRIPTION OF THE ILLUSTRATED EMBODIMENT

Figure 1:
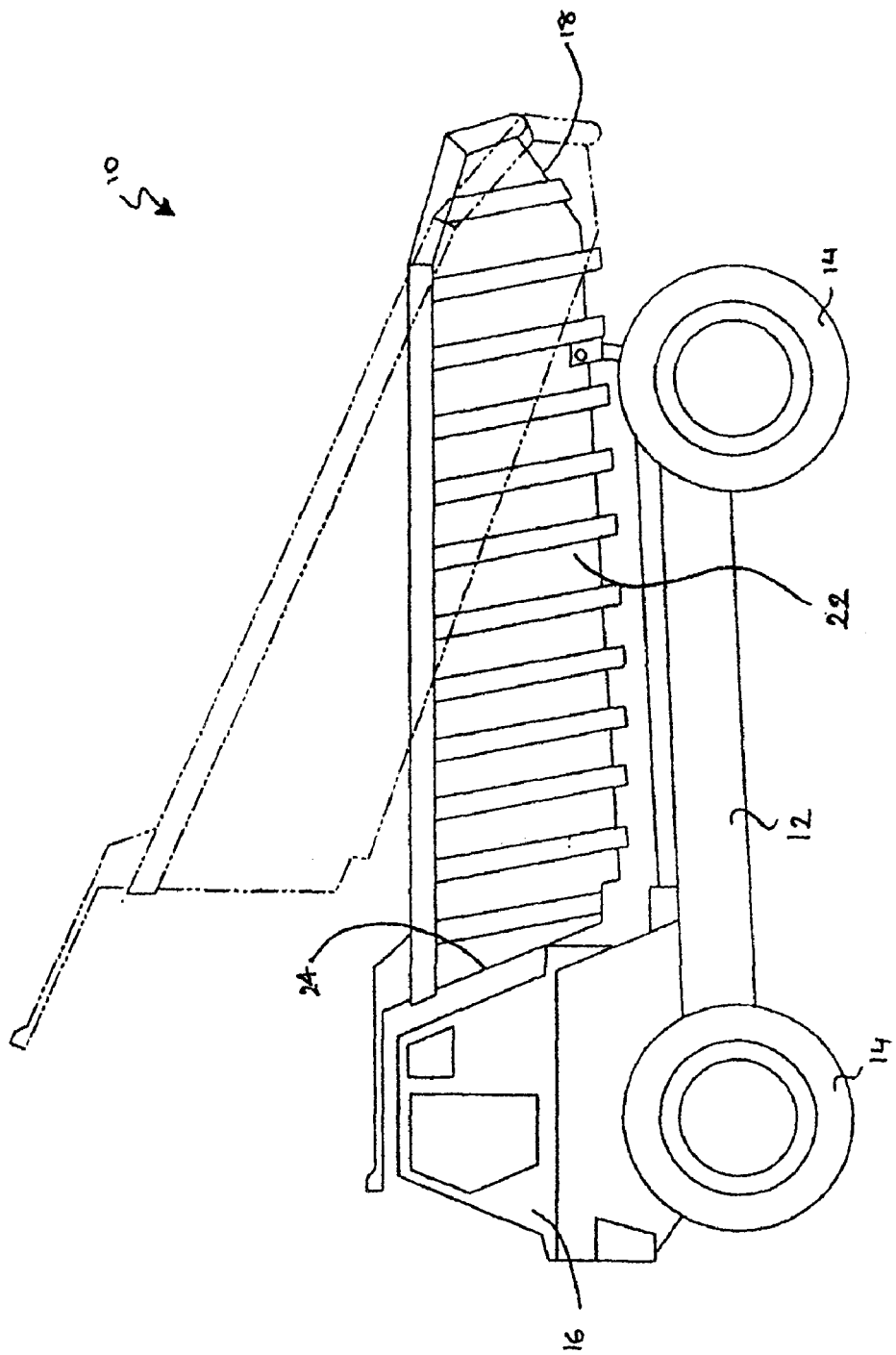
FIG. 1 is a side view of a dump truck having a dump body of the present invention.

Similar reference characters indicate corresponding parts throughout the several views of the drawings.

Dimensions of certain of the parts shown in the drawings may have been modified and/or exaggerated for the purposes of clarity or illustration.

FIGS. 1 to 4 show a dump truck carrying a dump body into which material can be loaded for transport and then unloaded. Dump trucks of this type are typically used in the mining and construction industries and therefore the material to be transported can include soil, rocks, coal and the like.

The dump truck (10) is a self propelled vehicle and may be an off-highway vehicle that is used to carry tons of material in operations such as mining. Dump truck (10) includes a chassis (12) that is supported by wheels and tyres (14). The chassis (12) carries a cab (16) at a forward end and a box-like rigid load carrying dump body (18) at the back end. Whilst the illustrated embodiment shows a self propelled vehicle, the container of the present invention may also be in the form of a trailer or any other suitable form.

The dump body (18) is pivotally coupled to the chassis at the back end and the dump body can be tilted between a loading position and an unloading position (shown in phantom in FIG. 1) in which the forward end of the dump body is raised to allow material to flow out of the back of the body under the influence of gravity. The forward end can be raised using any conventional mechanical or hydraulic lifting mechanism known in the art.

The body (18) has a substantially rigid planar floor (20) and a pair of rigid, spaced side walls (22) extending upwards from the floor. A rigid front wall (24) also extends upwardly from the floor (20) and is connected to each side wall (22). The floor and walls form a generally box shaped materials container for carrying a payload. An open rearward spillway (26) allows for dumping of the material out of the back of the body. The side walls, front wall and floor are formed of steel plate.

In an unmodified form, a back third or so of the floor is prone to abrasion by the flow of material over the surface. In practice it has been found that about 90% of the wear occurs in the back 0.5 to 1 meter of the floor surface. Abrasion of the surface then provides keyholes for the load to attach to, thus retarding the flow of material over the floor surface. In practice this has as significant impact on impeding the load from sliding off the surface. The present invention provides a container having one or more wear plates (27) covering preferably at least a back third of the floor surface (20) and/or one or more wear plates (34) extending between a wall and the adjacent floor surface. The wear plate(s) reduce abrasion or scoring of the surface so that resistance to sliding of materials out of the container is reduced. This then leads to a benefit in that in unloading a dump body it is not necessary to rapidly raise and lower the dump body to ensure that the material slides over the surface and reduces wear on the hydraulics used in lifting the dump body.

Under normal conditions of use, the material carried in the dump body may contain a considerable amount of moisture. On being dumped into the body and then transported the moist material can become compacted and the combination of the moisture content and the compaction creates high adhesion forces within the material load. This then leads to difficulties in emptying the material from the container because the entire load wants to be emptied at the same time.

Figure 2:
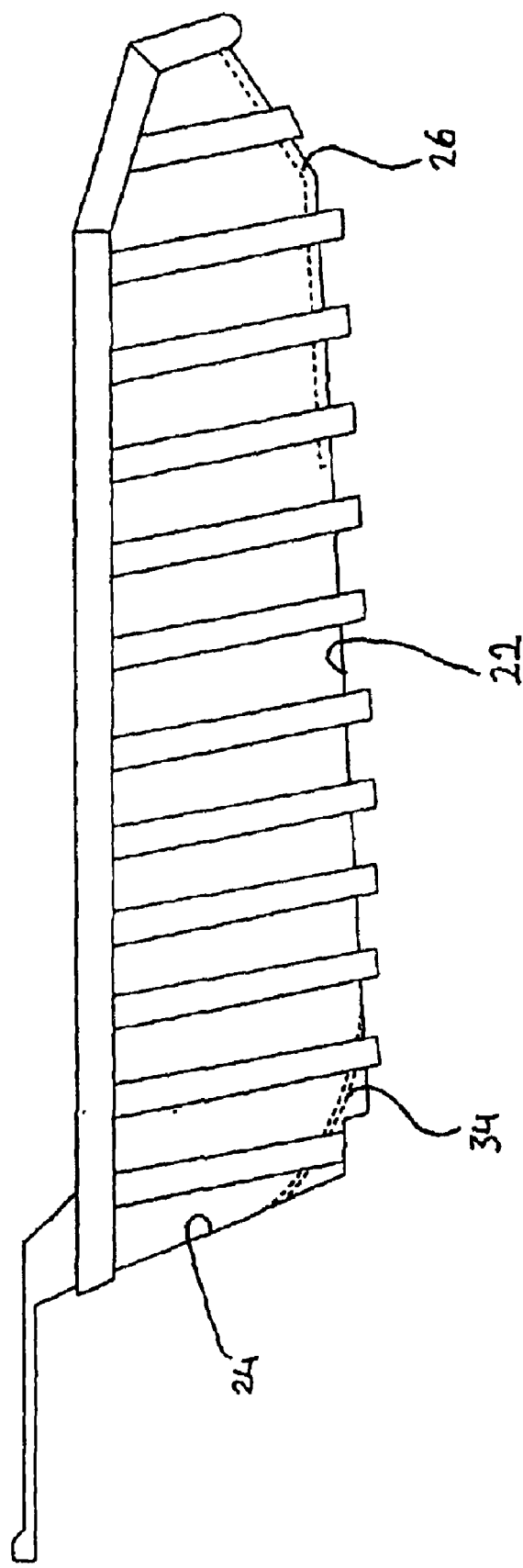
FIG. 2 is a side view of a dump body with the locations of wear resistant plates shown in phantom.
Figure 3:
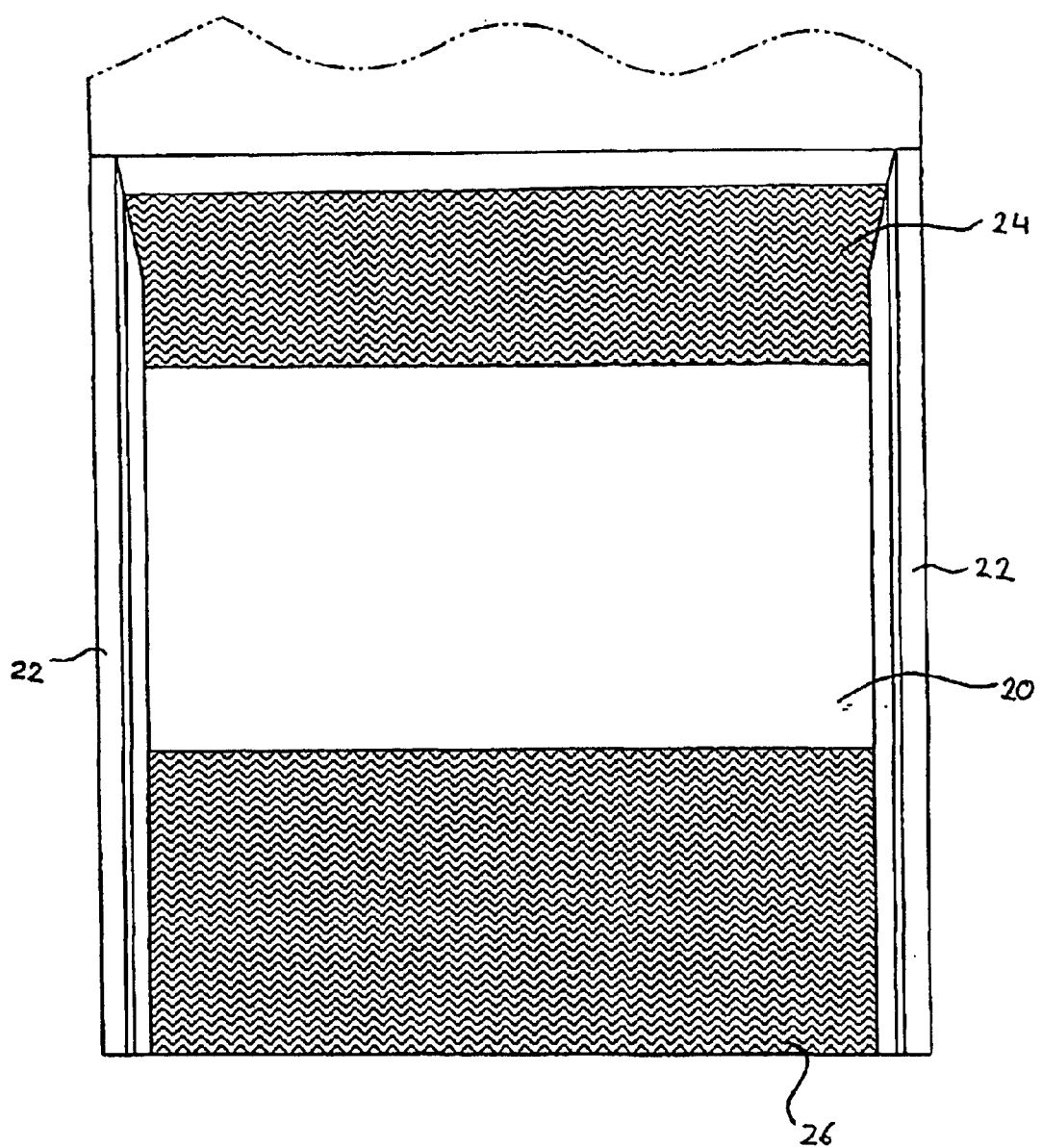
FIG. 3 is a plan view from above of a prior art dump body showing common areas for hang up of material.
Figure 4:
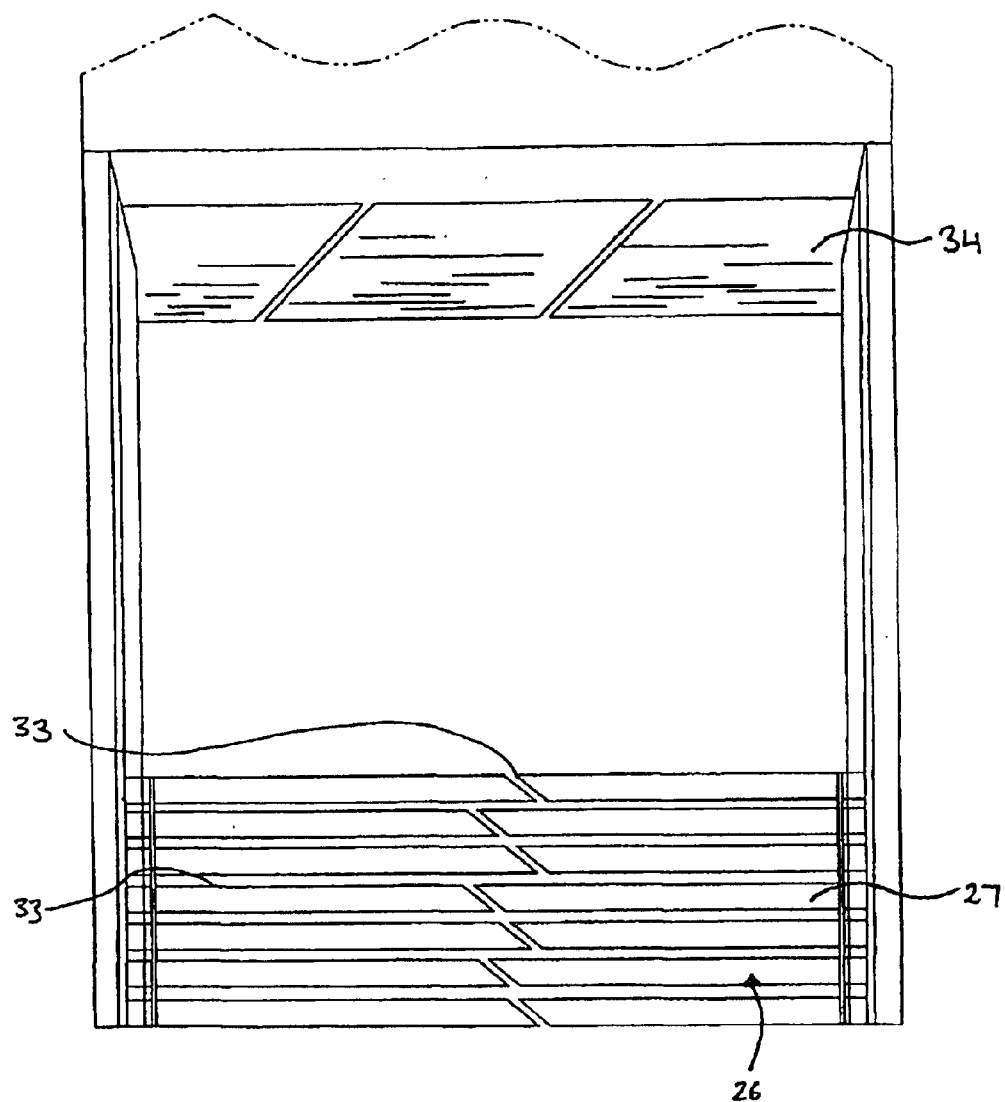
FIG. 4 is a plan view from above of a dump body according to the first and second aspects of the present invention.
Figure 5:
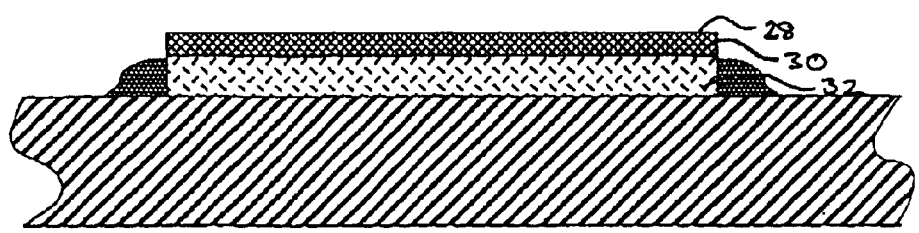
FIG. 5 is a cross sectional view through a wear resistant plate for use with the present invention.

As best seen in FIGS. 2 and 4, the wear plates cover approximately the back third of the floor surface of the container. The wear plates are in the form of strips of hard surfacing alloy (30) coated onto a mild steel backing (32). Wear plates that are particularly suited to this purpose may be manufactured according to the weld cast method described U.S. Pat. No. 5,362,937. These plates comprise a homogeneous alloy that is overlayed and smoothly bonded to a mild steel backing. The thickness of the alloy may be between 6 and 12 mm and the thickness of the mild steel backing may be between 5 and 11 mm.

Alloys with up to about 7 to 12 percent carbon and 20 to 30 percent alloy (usually about equal parts of manganese and chrome with some nickel) are suitable for use with the present invention. In these alloys hard primary and secondary carbides are formed and dispersed throughout the wear surface and they are much harder than the surrounding matrix and thereby provide excellent abrasion resistance. For example carbides having a Brinell hardness of 1600 to 1800 may be formed in the alloy. This is compared to the steel plate from which the dump body is formed which typically has a hardness of 250 to 300 Brinell. When the carbon content is less than about 3 percent the amount of carbides formed is small relative to the matrix and these alloys exhibit good abrasive wear resistant while retaining toughness and are therefore resistant to a combination of abrasion and impact. As the carbon content increases (up to about 7 percent) in the carbide containing alloys, the abrasion resistance increase and the toughness decreases.

In practice it has been found that the wear plates with these hard surfacing alloys tend to become very highly polished upon sliding of material over the surface and that the highly polished surface provides a poor adhesive contact between the surface and wet materials. Therefore the wear plates not only minimises scoring of the surface but also become polished which therefore decreases resistance to sliding of materials over the surface on use. Therefore the present invention provides not only a surface which does not wear or become abraded as readily, but also becomes polished upon use which therefore assists in unloading, even in the case of materials having a significant moisture content.

In trials conducted to date, a dump truck fitted with plates according to the present invention having an 8 mm alloy surface and a 10 mm mild steel backing has been operated for 6000 hours and there is still no significant wear on the floor surface. By contrast, a similar truck fitted with prior art surfacing plates of 25 mm thickness gave about 1000 hours of service before significant abrasion of the surface and hang up of materials was observed.

The upper surface of the wear plates is substantially flat in that it does not contain any protrusions, although it will be understood that a curved surface may be provided for that allows sliding of material thereon. This is in contrast to some prior art wear plates which have hemispherical wear protrusions, or raised strips extending across the surface.

Preferably the alloy of the contacting surface of the wear resistant plates has a hardness of greater than 500 Brinell hardness. The steel plate from which dump bodies are formed is typically 250 to 300 Brinell hardness.

The plates are fixed to the flow surface using any suitable means, including welding, by use of studs, by welding in countersunk hole inserts, by plug welding and by stitch welding.

The wear plates are provided in strip form of between 100 and 500 mm width. Most preferably the strips are 300 mm in width. A wear resistant surface can be built up on the floor surface by abutting strips against one another to form a more or less continuous surface. The ends of the strips are cut at an angle of 45° and adjacent strips can be abutted endwise and lengthwise. In this way surfaces of various sizes and configurations can be covered without having to manufacture plates to conform to a specific size or shape.

The strips are preferably laid transverse to the flow direction of material, although they may also be laid parallel to the flow direction of material in some circumstances.

In the illustrated embodiments and in a preferred forms of the invention, the strips are not abutted against one another but a gap (33) is left between adjacent strips. The gap provides several advantages. Firstly, when wear plates are fitted to form a more or less continuous surface it is often found that the wear plates crack and fall out because the plates themselves lack the degree of flexibility of the sheet metal of the dump body. The provision of gaps between adjacent strips allows the sheet metal of the dump body to flex and the wear plates can move together and apart to accommodate the flexion without cracking and falling off of the surface. Another advantage of providing gaps between adjacent plates is that individual plates are readily removed and replaced. Thus if one particular area becomes worn it may only be necessary to replace some of the wear plates. Individual wear plates may be fixed to the surface by stitch welding.

The width of the gaps is such that when loaded material is caught in the gaps it does not substantially affect passage of material over the surface. To achieve this it is found that the width of gaps may be less than about 20% of the width of the strips. Alternatively, at least 80% of the surface that is hard faced must be wear resistant plate. In use it is found that gaps with a width of between 5 and 20% of the width of the strips are sufficient to allow flexibility of the hard faced surface, but also to not substantially affect passage of material over the surface. Once the width of the gaps is any larger than about 20% the gaps tend to act as 'rockboxes' that fill with the loaded material. This may be satisfactory for dry materials because the rockboxes form a barrier between the loaded material and the floor surface. However if the loaded material contains any moisture, such as may be the case in mining operations, the material is prone to stick together and therefore the larger width gaps may affect passage of material over the surface as some of the material becomes trapped in the gaps.

Coverage of the back third of the container floor with wear resistant plates may be considered a preferred minimum coverage (although coverage of the most wear prone 0.5 to 1 meters will provide for certain advantages) and the wear resistant plates may cover the whole floor surface. However it will be appreciated that the fitting cost will therefore rise accordingly and a benefit of the present invention is that only about the back third need be covered in order to minimise hang up of material in the body.

In practice it is found that the back third of the container experiences significant abrasion and once it is abraded it limits flow of material out of the container because the abraded surface is the lowermost surface when the container is tilted for emptying. In particular it has been found that around 90% of the wear occurs in the lowermost 0.5 to 1 meter and therefore it is expected a significant reduction in the amount of hang up will also be observed if less than the lowermost third is covered by wear plates. The provision of wear resistant plates at this point therefore minimises any tendency for the material to not slide over the surface. Thus, the easy and rapid flow of material across the lower third of the floor surface then means that the lower part of the material flows off easily and thence the upper material flows directly behind it.

Any one or more of the side walls or front wall, or sections thereof, may also be covered by the wear resistant plates. In this way any abrasive resistance to flow exerted by the walls may also be minimised. For reasons discussed previously, it may only be necessary for the back third of the side walls to be covered by wear resistant plates.

In practice it is also found that the angular nature of the junction between the side and front walls and the floor surface also provides keyholds for the material to latch to. Thus for instance it is known that in an unmodified dump body when the body is tilted a certain quantity of material remains attached to the uppermost portion of the tilted body and does not slide down under the influence of gravity. Additionally, the junctions between side walls and the floor surface cause material to hang up in those regions of the dump body.

Plates may be fitted at the junctions between the side walls and the floor and the front wall and the floor to minimise hang up of material in those regions. The plates need not necessarily be formed from wear resistant material and for example mild steel could be used to reduce costs. The effect of these plates removing the angular wall/floor junction in addition to the effect of the wear resistant plates on the back third of the floor surface may be sufficient to minimise hang up in the dump body. However in that case the wall/floor junction plates will be come abraded and worn over time. For that reason it is greatly preferred that the wall/floor junctions are also fitted with wear resistant plates (34) which are fitted over a junction between walls and the floor of the body. A combination of the angle of the wear resistant plates and the flow characteristics of the surface thereby minimise the hang up of material in the areas where the plates are fitted.

In one form of the invention that is illustrated in FIGS. 1 to 4, wear resistant plates are fitted over the junction of the front wall and the floor, as well as to the back third of the floor surface. The plates (34) are curved and are fitted between the front wall and the floor so that they are outwardly concave. The plates are welded to each of the floor and wall surfaces and a gap is provided between the ends of adjacent plates. It is found that a wear resistant plate (34) having a radius of curvature of at least 250 mm is suitable for this purpose. Preferably the radius of curvature is 250 to 500 mm, and most preferably is 300 mm.

Figure 6:
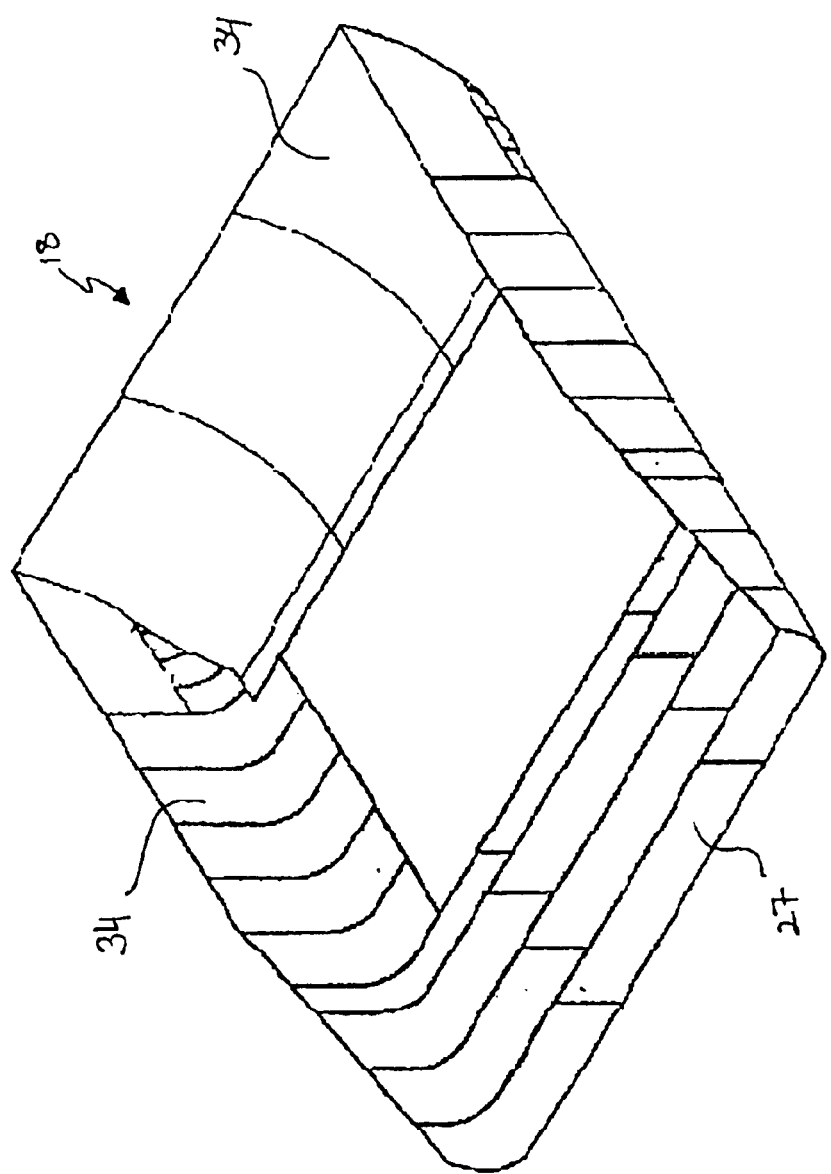
FIG. 6 is a perspective view of a further form of dump body having wall/floor junction and floor surface wear plates.

In the embodiment illustrated in FIGS. 6 to 8, curved wear resistant plates (34) are also fitted along the junction between side walls and the floor. In this case the plates are formed from strips of the same width as those used on the lower third of the floor surface and the strips are fitted with gaps between adjacent strips, as best seen in FIG. 8. The strips are 300 mm wide and the gaps are 25 mm wide. The strips are fitted so that they are transverse to the direction of flow of material out of the dump body.

As best seen in FIG. 7, many existing dump bodies have an approximately 45° angled wall (36) at the junction between the side walls and the floor surface. It is found that in that case the angled junctions between walls (36) and the floor or side wall still cause material to hang up in the area. However fitting of a curved wear resistant plate helps to ameliorate this problem.

As best seen in FIG. 7, the curved wear plates are fitted over the side wall/floor junction so that an apex of the curve bears against the angled side wall (36), thereby distributing some of the load borne by the wear plate back to the dump body. For the side wall/floor junction it is found that a wear resistant plate (34) having a radius of curvature of 250 to 500 mm is suitable. In the illustrated embodiment the radius of curvature is 375 mm.

Whilst the invention has been described particularly with reference to containers in the form of dump bodies on dump trucks, it will be appreciated that the invention is not limited thereto and is applicable to any material transport container is which the material is unloaded by flowing out of the container, such as buckets in front end loaders and the like.

What is claimed is:

1. A dump truck body having a floor and two opposed side walls and a front wall, said walls extending upwardly from the floor, the body further having an unloading end, the body being supported to enable tilting for unloading of material from the unloading end,
the body comprising a plurality of hard faced wear plates providing a substantially continuous and smooth hard faced sliding surface on an unloading portion of the floor adjacent the unloading end, so as to enhance the sliding of material over the smooth hard faced sliding surface, the wear plates comprising a layer of hard surfacing alloy, over a mild steel base, a surface of the alloy finished to form the hard faced sliding surface,
there being provided one or more curved, arcuate surfaces bridging a junction between one or more of the front and side walls and the floor of the body to reduce hangup of material thereon.

2. A dump truck body as in claim 1 wherein the one or more curved, arcuate surfaces comprise one or more arcuate hard faced wear plates each having a layer of hard surfacing alloy over a mild steel base, a surface of the alloy of the arcuate wear plate being finished to form an arcuate smooth hard faced surface.

3. A dump truck body as in claim 2 wherein one of the one or more curved, arcuate surfaces bridges a junction between the front wall and the floor of the body.

4. A dump truck body as in claim 2 wherein one of the one or more curved, arcuate surfaces bridges a junction between the front wall and the floor of the body, and two other ones of said one or more curved, arcuate surfaces bridge joints between the opposed side walls and the floor on either side of the unloading portion of the floor.

5. A dump truck body as in claim 2 wherein one of the one or more curved, arcuate surfaces bridges a junction between the front wall and the floor of the body, and two other ones of said curved, arcuate surfaces bridge joints between the opposed side walls and the floor on either side of the floor, and extending along the length of the floor.

6. A dump truck body as in claim 1 wherein the smooth hard faced sliding surface is provided by a liner fastened to the dump truck body.

7. A dump truck body as in claim 6 wherein the liner is provided by a plurality of said wear plates.

8. A dump truck body as in claim 7 wherein said wear plates are spaced apart to allow for flexion between adjacent ones of said wear plates.

9. A dump truck body as in claim 7 wherein a gap between adjacent ones of said wear plates is less than 20% of a width of the adjacent ones of said wear plates.

10. A dump truck body as in claim 9 wherein the gap is about 25 mm.

11. A dump truck body as in claim 2 wherein a radius of the one or more curved, arcuate surfaces is greater than about 250 mm.

12. A dump truck body as in claim 2 wherein a minimum radius of the one or more curved, arcuate surfaces is about 300 mm.

13. A dump truck body as in claim 6 wherein the mild steel base is between 5 and 11 mm in thickness.

14. A dump truck body as in claim 1 wherein the hard surfacing alloy is a carbide containing alloy, with primary and secondary carbides in an alloy matrix.

15. A dump truck body as in claim 1 wherein the hard faced sliding surface has a Brinell hardness of 500.

16. A dump truck body as in claim 13 wherein the thickness of the alloy is between 6 and 12 mm.

17. A dump truck body as in claim 2 wherein the arcuate surfaces are provided by a liner fastened to the body.

18. A dump truck body as in claim 1 wherein said one or more curved, arcuate surfaces are provided by a liner fastened to the dump truck body.

19. A dump truck body as in claim 1 wherein the unloading portion of the floor with a hard faced surface is about 0.5 meters taken from the unloading end of the floor.

20. A dump truck body as in claim 1 wherein the unloading portion of the floor with a hard faced surface is about 1 meter taken from the unloading end of the floor.

21. A dump truck body as in claim 1 wherein the unloading portion of the floor with a hard faced surface is about one third of the floor taken from the unloading end of the body.

* * * * *